(12) United States Patent  (10) Patent No.: US 7,006,189 B2
Kim et al.  (45) Date of Patent: Feb. 28, 2006

(54) IN-PLANE SWITCHING MODE LIQUID CRYSTAL DISPLAY DEVICE AND MANUFACTURING METHOD THEREOF

(75) Inventors: Ik-Soo Kim, Gyeonggi-do (KR);
Chang-Yeon Kim, Seoul (KR);
Gi-Hong Kim, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/893,951

(22) Filed: Jul. 20, 2004

(65) Prior Publication Data

US 2004/0263755 A1    Dec. 30, 2004

Related U.S. Application Data

(63) Continuation of application No. 09/987,038, filed on Nov. 13, 2001, now Pat. No. 6,784,965.

(30) Foreign Application Priority Data

Nov. 14, 2000  (KR)  ................................ 2000-67516
Jan. 18, 2001  (KR)  ................................ 2001-2969

(51) Int. Cl.
*G02F 1/1343*  (2006.01)
*G02F 1/1333*  (2006.01)
*G02F 1/13*    (2006.01)

(52) U.S. Cl. ...................... 349/141; 349/138; 349/143; 349/187

(58) Field of Classification Search ................ 349/42, 349/141, 143, 138, 187
See application file for complete search history.

(56) References Cited

U.S. PATENT DOCUMENTS 5,598,285 A   1/1997  Kondo et al. ................ 349/39
5,745,207 A   4/1998  Asada et al. ................ 349/141
5,838,037 A   11/1998 Masutani et al. ........... 257/296
5,905,556 A   5/1999  Suzuki et al. ............... 349/141
5,946,060 A   8/1999  Nishiki et al. ............... 349/48
5,946,066 A   8/1999  Lee et al. .................... 349/141
5,990,987 A   11/1999 Tanaka ........................ 349/43

(Continued)

FOREIGN PATENT DOCUMENTS

JP    09-005764    1/1997

(Continued)

OTHER PUBLICATIONS

R. Kieler et al.; "In-Plane Switching of Nematic Liquid Crystals"; Japan Display '92; pp. 547-550.

(Continued)

*Primary Examiner*—Tarifur R. Chowdhury
(74) *Attorney, Agent, or Firm*—McKenna Long & Aldridge LLP

(57) ABSTRACT

An array substrate for an in-plane switching liquid crystal display device including a substrate; a gate line and a data line on the substrate, the data line having at least one bent portion; a thin film transistor at a crossing portion of the gate and data lines; a passivation layer on an entire surface of the substrate including the thin film transistor; a plurality of common electrode on the passivation layer, the plurality of common electrodes having at least one bent portion, wherein at least one of the plurality of common electrodes overlaps at least a portion of the data line; a common line connected to the common electrodes; and a plurality of pixel electrodes on the passivation layer, the plurality of pixel electrodes being alternated with the common electrodes, each pixel electrode having at least one bent portion.

19 Claims, 20 Drawing Sheets

U.S. PATENT DOCUMENTS

| | | | |
|---|---|---|---|
| 6,028,653 A | 2/2000 | Nishida | 349/141 |
| 6,097,454 A | 8/2000 | Zhang et al. | 349/43 |
| 6,266,116 B1 | 7/2001 | Ohta et al. | 349/141 |
| 6,288,763 B1 | 9/2001 | Hirota | |
| 6,466,289 B1 * | 10/2002 | Lee et al. | 349/141 |
| 6,512,565 B1 * | 1/2003 | Lee et al. | 349/130 |
| 6,680,772 B1 * | 1/2004 | Lee | 349/141 |
| 2001/0040663 A1 * | 11/2001 | Jun | 349/141 |
| 2002/0024626 A1 * | 2/2002 | Lee et al. | 349/141 |
| 2002/0036743 A1 * | 3/2002 | Youn et al. | 349/141 |
| 2002/0047975 A1 * | 4/2002 | Lee et al. | 349/141 |
| 2002/0154262 A1 * | 10/2002 | Yamakita et al. | 349/141 |

FOREIGN PATENT DOCUMENTS

| | | |
|---|---|---|
| JP | 09-073101 | 3/1997 |
| JP | 09-101538 | 4/1997 |
| JP | 09-105908 | 4/1997 |
| JP | 10-221705 | 8/1998 |
| JP | 11-125836 | 5/1999 |

OTHER PUBLICATIONS

M. Oh-e, et al.; "Principles and Characteristics of Electro-Optical Behaviour with In-Plane Switching Mode"; Asia Display '95; pp. 577-580.

M. Ohta et al.; "Development of Super-TFT-LCDs with In-Plane Switching Display Mode"; Asia Display '95; pp. 707-710.

S. Matsumoto et al.; Display Characteristics of In-Plane Switching (IPS) LCDs and a Wide-Viewing-Angle 14.5-in. OPS TFT-LCD; Euro Display '96; pp. 445-448.

H. Wakemoto et al.; "An Advanced In-Plane Switching Mode TFT-LCD"; SID 97 Digest; pp. 929-932.

S. H. Lee et al.; High-Transmittance, Wide-Viewing-Angle Nematic Liquid Crystal Display Controlled by Fringe-Field Switching; Asia Display '98; pp. 371-374.

* cited by examiner

OFF STATE

ON STATE

IN-PLANE SWITCHING MODE LIQUID CRYSTAL DISPLAY DEVICE AND MANUFACTURING METHOD THEREOF

This application is a continuation of prior application Ser. No. 09/987,038, filed Nov. 13, 2001, now U.S. Pat. No. 6,784,965; which claims priority to Korean Patent Application No. 2000-0067516, filed on Nov. 14, 2000, and Korean Patent Application No. 2001-0002969, filed on Jan. 18, 2001, each of which are hereby incorporated by reference for all purposes as if fully set forth herein.

BACKGROUND OF THE INVENTION

1. Field of the Invention

The present invention relates to a liquid crystal display device, and more particularly to a liquid crystal display device implementing in-plane switching (IPS) where an electric field to be applied to liquid crystal is generated in a plane parallel to a substrate.

2. Discussion of the Related Art

A typical liquid crystal display (LCD) device uses optical anisotropy and polarization properties of liquid crystal molecules. The liquid crystal molecules have a definite orientational order in alignment resulting from their thin and long shapes. The alignment direction of the liquid crystal molecules can be controlled by applying an electric field to the liquid crystal molecules. In other words, as the alignment direction of the electric field is changed, the alignment of the liquid crystal molecules also changes. Since the incident light is refracted to the orientation of the liquid crystal molecules due to the optical anisotropy of the aligned liquid crystal molecules, images are displayed.

Generally, typical LCD devices include upper and lower substrates with liquid crystal molecules interposed therebetween. The upper and lower substrates are generally referred to as color filter and array substrates, respectively. The upper and lower substrates respectively include electrodes disposed on opposing surfaces of the upper and lower substrates. An electric field is generated by applying a voltage to the electrodes, thereby driving the liquid crystal molecules to display images depending on light transmittance.

Of the different types of known LCDs, active matrix LCDs (AM-LCDs), which have thin film transistors and pixel electrodes arranged in a matrix form, are the subject of significant research and development because of their high resolution and superiority in displaying moving images. Driving methods for such LCDs typically include a twisted nematic (TN) mode and a super twisted nematic (STN) mode.

However, the operation mode of the TN- or STN-LCD panel has a disadvantage of a narrow viewing angle. That is to say, the TN liquid crystal molecules rotate with polar angles 0 to 90 degrees, which are too wide. Because of the large rotating angle, contrast ratio and brightness of the TN- or STN-LCD panel fluctuate rapidly with respect to the viewing angles.

To overcome the problem, an in-plane switching (IPS) LCD panel was developed. The IPS-LCD devices typically include a lower substrate where a pixel electrode and a common electrode are disposed, an upper substrate having no electrode, and a liquid crystal interposed between the upper and lower substrates. Therefore, the IPS-LCD panel implements a parallel electric field that is parallel to the substrates, which is different from the TN- or STN-LCD panel and has advantages in contrast ratio, gray inversion, and color shift that are related to the viewing angle.

A detailed explanation about operation modes of a typical IPS-LCD device will be provided with reference to FIGS. 1 to 5.

As shown in FIG. 1, upper and lower substrates 1 and 2 are spaced apart from each other, and a liquid crystal 3 is interposed therebetween. The lower and upper substrates are called array and color filter substrates, respectively. Pixel and common electrodes 4 and 5 are disposed on the lower substrate 2. The pixel and common electrodes 4 and 5 are parallel with and spaced apart from each other. A color filter 7 is disposed on a surface of the upper substrate 1 and opposes the lower substrate 2. The pixel and common electrodes 4 and 5 apply an electric field 6 to the liquid crystal. The liquid crystal has a negative dielectric anisotropy, and thus it is aligned parallel with the electric field 6.

FIGS. 2 to 5 conceptually illustrate operation modes of a typical IPS-LCD device. When there is no electric field between the pixel and the common electrodes 4 and 5, the long axes of the liquid crystal molecules 3 maintain an angle, for example, the angle is 45 degrees, from a line perpendicular to the parallel pixel and common electrodes 4 and 5 as shown in FIG. 3. On the contrary, when there is an electric field between the pixel and common electrodes 4 and 5, there is an in-plane electric field 6 parallel to the surface of the lower substrate 2 between the pixel and common electrodes 4 and 5 because the pixel and common electrodes are formed on the lower substrate 2 as shown in FIG. 4. Accordingly, the liquid crystal molecules 3 are twisted so as to align the long axes thereof in the direction of the electric field, thereby being aligned such that the long axes thereof are parallel with the line perpendicular to the elongated direction of the pixel and common electrodes 4 and 5 as shown in FIG. 5. By the above-mentioned operation modes and with additional parts such as polarizers and alignment layers, the IPS-LCD device displays images. The IPS-LCD device has a wide viewing angle and low color dispersion characteristic. Specifically, the viewing angle of the IPS-LCD device is about 70 degrees in direction of up, down, right, and left. In addition, the fabricating processes of this IPS-LCD device are simpler than other various LCD devices.

FIG. 6 is a schematic plan view of an array substrate of the typical IPS-LCD device.

As shown, a pixel area is defined by a row gate line 11 and a column data line 41. A TFT "T", the switching device, is formed at the crossing of gate and data lines. In the pixel area, a common line 15 is elongated along the direction of the gate line 11 and a plurality of common electrodes 16 connected to the common line 15 are elongated along the direction of the data line 41. Moreover, in the pixel area, a plurality of pixel electrodes 43, which are spaced apart from the common electrodes 16 and arranged in an alternating pattern, is connected to the TFT "T" and the pixel line 45. The pixel line 45 overlaps the gate line 11 to make a storage capacitor "S".

Therefore, in the IPS-LCD devices, since lateral electric field is formed between the common electrodes 16 and the pixel electrodes 43 of the same plane and the liquid crystal molecules are aligned parallel to the lateral electric field, the viewing angle can be improved. Furthermore, the IPS-LCD devices have low color dispersion qualities and the fabricating processes thereof are simpler than those of other various LCD devices.

However, because the common and pixel electrodes 16 and 43 are disposed on the same plane on the lower substrate, the transmittance and aperture ratio are low. In addition, a response time according to a driving voltage should be improved and a cell gap should be uniform because of the low alignment margin. A color shift problem according to the viewing angle still remains. These problems are dependent on the rotational direction of the liquid crystal molecules under the electric field over the threshold voltage and are generated from the increase or decrease of the retardation and of the liquid crystal layer according to the viewing angle.

FIG. 7 is a schematic plan view of an array substrate of the IPS-LCD device for solving the color shift problem.

As shown, upper and lower domains "A" and "B" are formed by bending the common and pixel electrodes 16 and 43 at an angle with respect to the common line 15. The electric field between two electrodes 16 and 43 rotates the liquid crystal molecules 81 and 82 of the domains "A" and "B" in opposite direction from each other. A liquid crystal molecule of the upper domain "A" is rotated clockwise and a liquid crystal molecule of the lower domain "B" is rotated counter-clockwise. Therefore, the liquid crystal molecules 81 and 82 of two domains "A" and "B" are aligned in different directions to compensate the color shift effectively.

Here, since the data line 41 is also bent at an angle with respect to the common line 15 and is patterned parallel to the common and pixel electrodes 16 and 43, the space between the data line 41 and the common electrode 16 can decrease, and the aperture ratio can be improved. To make the most of these advantages, a black matrix of an upper substrate also should have a bent portion. However, in the IPS-LCD device, since the metallic black matrix affects the voltage between the common and pixel electrodes 16 and 43, the black matrix is made of resin, which cannot be formed with a bent portion because of the limit of the processing technology. Therefore, the IPS-LCD device of FIG. 7 has a limit for effective realization.

FIGS. 8A to 8D are sequential cross-sectional views taken along a line "VIII—VIII" of FIG. 7 showing the fabrication process for the array substrate of the typical IPS-LCD device.

FIG. 8A shows the step of patterning gate electrode 12, common and storage electrodes 16 and 11 of a first metal layer, which can be made of metal, for example, aluminum (Al) or chromium (Cr), on the substrate 10.

FIG. 8B shows the step of forming a gate insulator 21 and patterning an active layer 23 and an ohmic contact layer 25 on the first metal layer. The gate insulator 21 can be made of silicon nitride (SiNx) and the ohmic contact layer 25 is doped by impurities.

FIG. 8C shows the step of patterning another storage electrode 45 and source 47, drain 49, pixel 43, electrodes and data line 41, of a second metal layer. The source and drain electrodes 47 and 49 are patterned on the ohmic contact layer 25 and the pixel electrodes 43 are spaced apart from the common electrodes 16 on the gate insulator 21.

FIG. 8D shows the step of forming a passivation layer 51, which prevents the active layer 23 from contamination of mists or impurities, on the entire surface of the substrate.

SUMMARY OF THE INVENTION

Accordingly, the present invention is directed to an in-plane switching liquid crystal display device and manufacturing method thereof that substantially obviates one or more of problems due to limitations and disadvantages of the related art.

An object of the present invention is to provide an in-plane switching liquid crystal display device that has a wide viewing angle and a high aperture ratio and a manufacturing method thereof.

Another object of the present invention is to provide an in-plane switching liquid crystal display device that has an improved color shift and a manufacturing method thereof.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for an in-plane switching liquid crystal display device includes a substrate, a gate line extending along a first direction on the substrate, a data line extending along a second direction on the substrate and having at least one bent portion, a thin film transistor connected to the gate and data lines, a plurality of common electrodes extending along the second direction and having at least one bent portion, wherein at least one of the common electrodes overlaps a portion of the data line, a common line elongating along the first direction and connected to the plurality of common electrodes, a plurality of pixel electrodes alternated with the common electrodes and having at least one bent portion and a pixel line extending along the first direction and connected to the plurality of pixel electrodes.

In another aspect of the present invention, a method of fabricating an array substrate includes forming a common line extending along a first direction, a plurality of common electrodes extending along a second direction and having a substantially zigzag shape, a gate line extending along the first direction and a gate electrode on a substrate, forming a gate insulator on the gate and common lines, forming a semiconductor layer on the gate insulator, forming a data line extending along the second direction having a substantially zigzag shape and overlapping with at least one of the common electrodes and source and drain electrodes connected to the data line on the semiconductor layer, forming a passivation layer on the data line and the source and drain electrodes and forming a plurality of pixel electrodes extending along the second direction, having a substantially zigzag shape and alternated with the common electrodes and a pixel line connected to the pixel electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
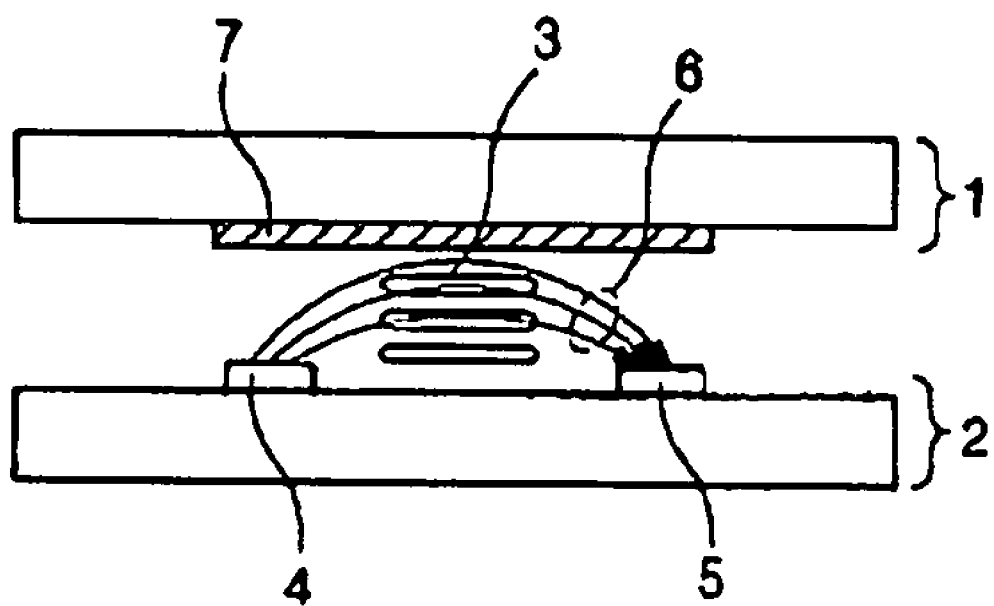
FIG. 1 is a schematic cross-sectional view of a typical IPS-LCD device.
Figure 2:
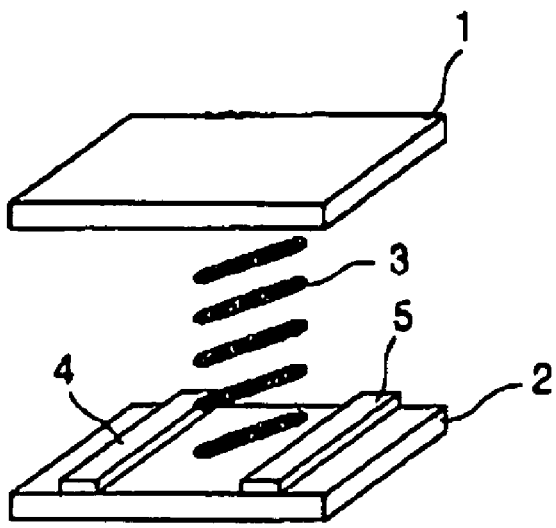
FIGS. 2 and 3 are perspective views illustrating off state operation of the typical IPS-LCD device.
Figure 3:
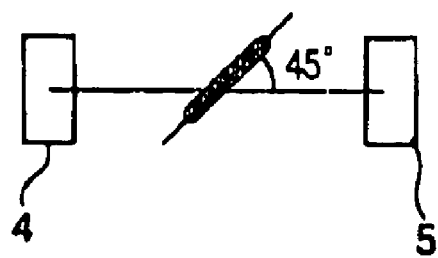
Figure 4:
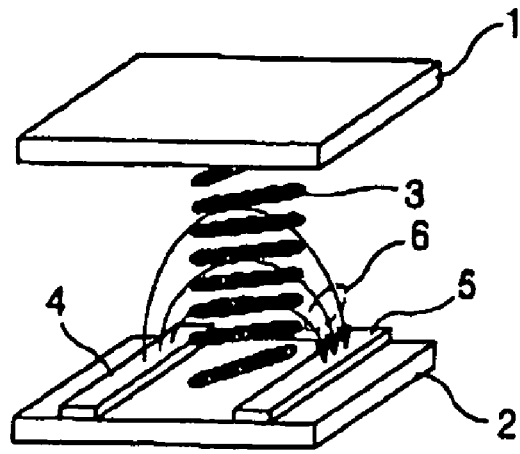
FIGS. 4 and 5 are perspective views illustrating on state operation of the typical IPS-LCD device.
Figure 5:
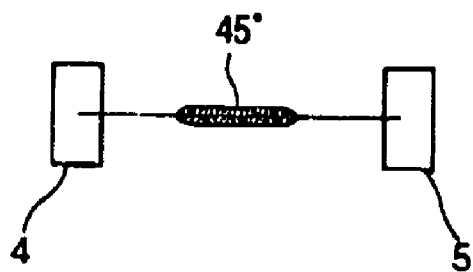
Figure 6:
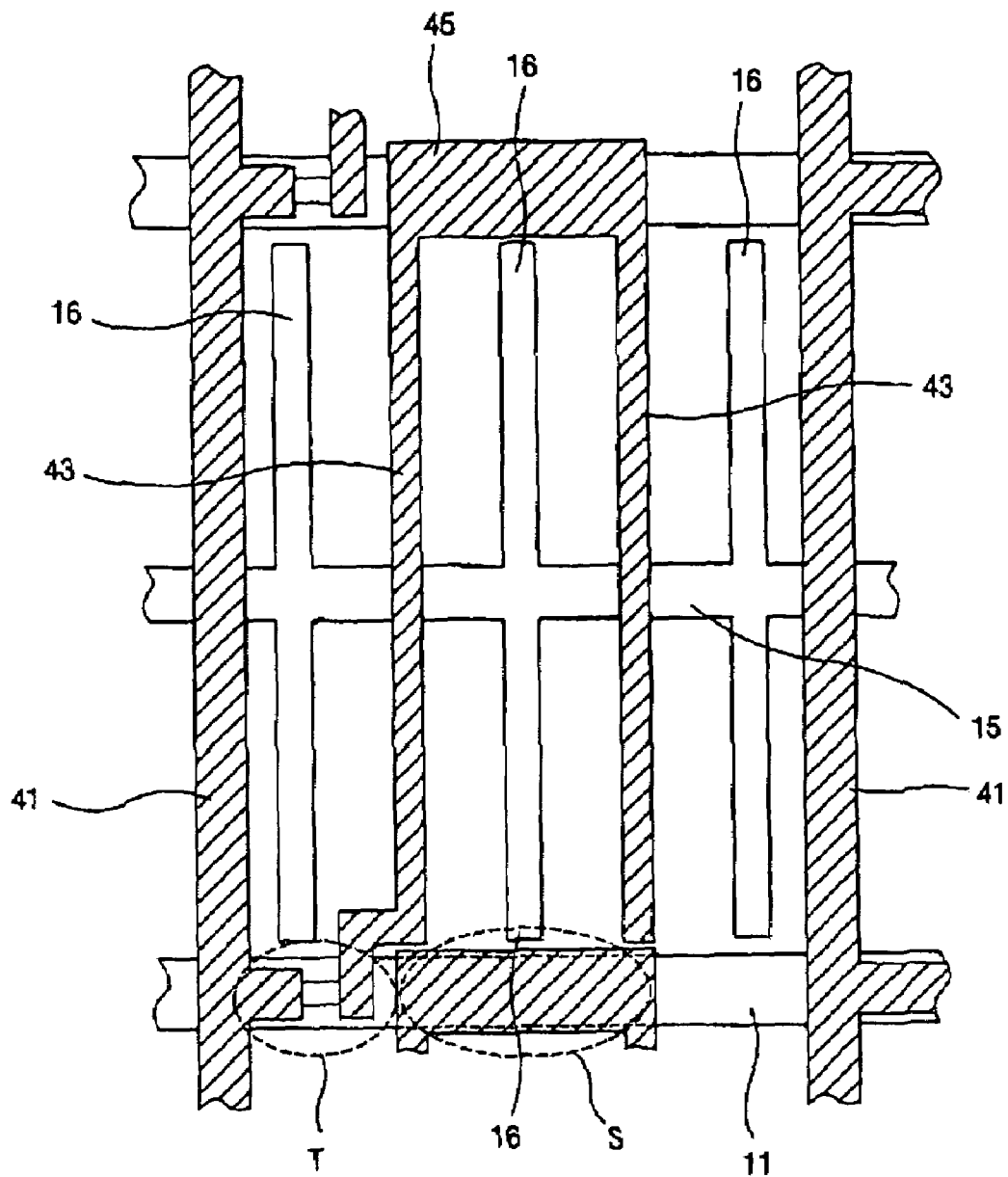
FIGS. 6 and 7 are schematic plan views of array substrates of the typical IPS-LCD device.
Figure 7:
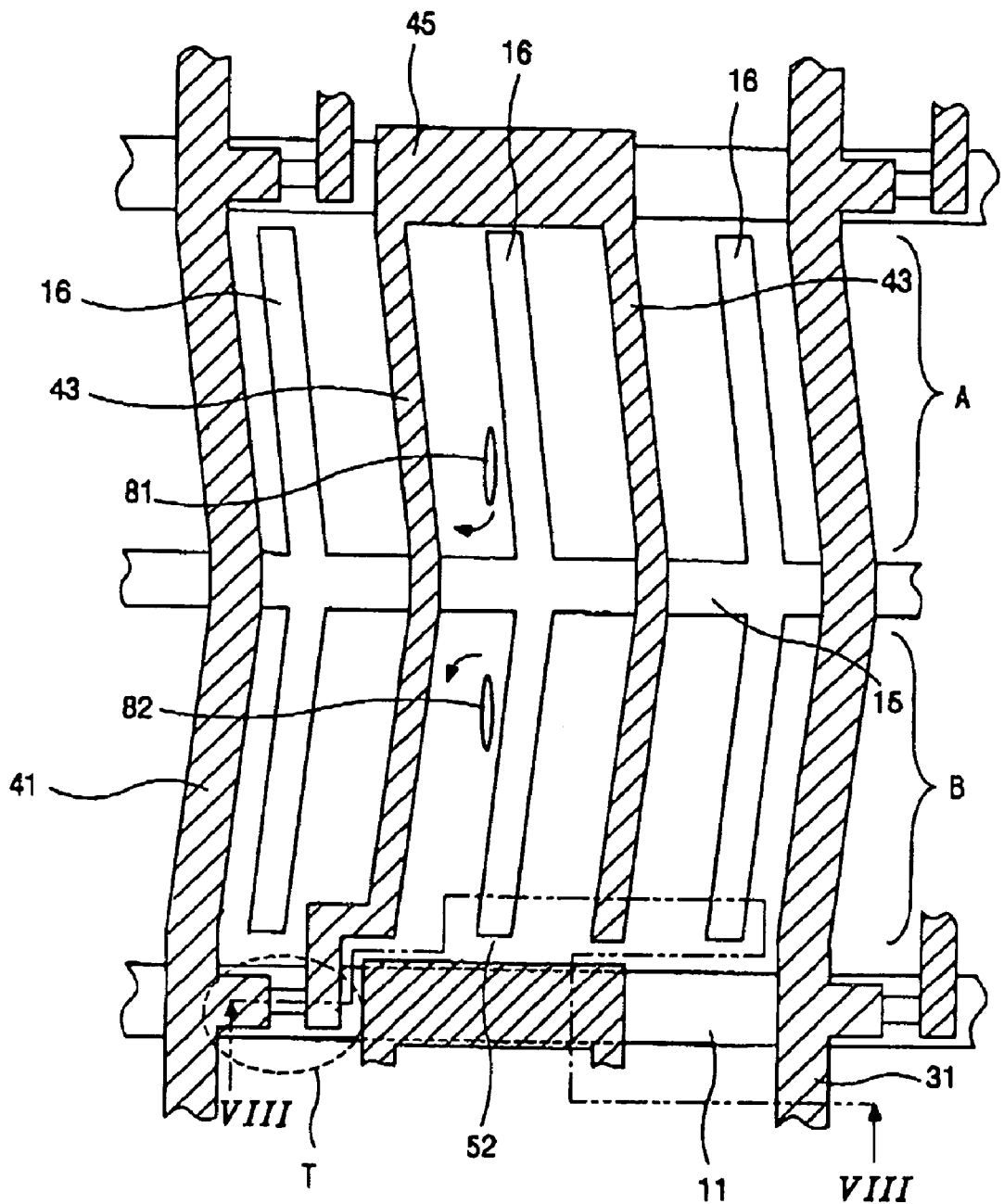
Figure 8A:
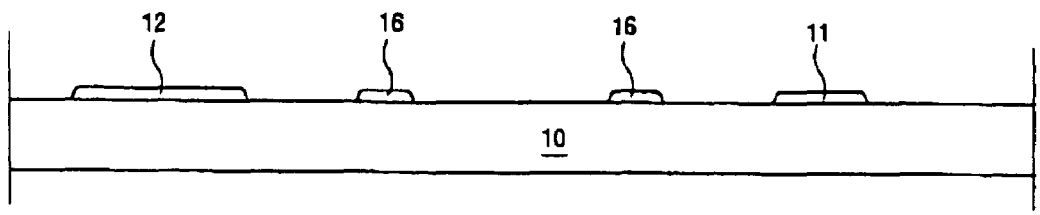
FIGS. 8A to 8D are sequential cross-sectional views taken along a line "VIII—VIII" of FIG. 7.
Figure 8B:
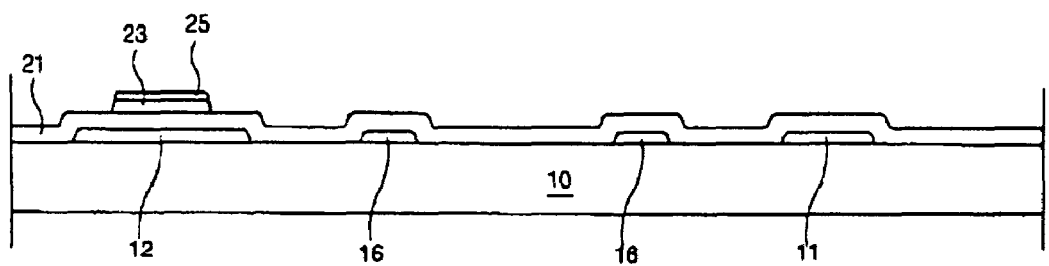
Figure 8C:
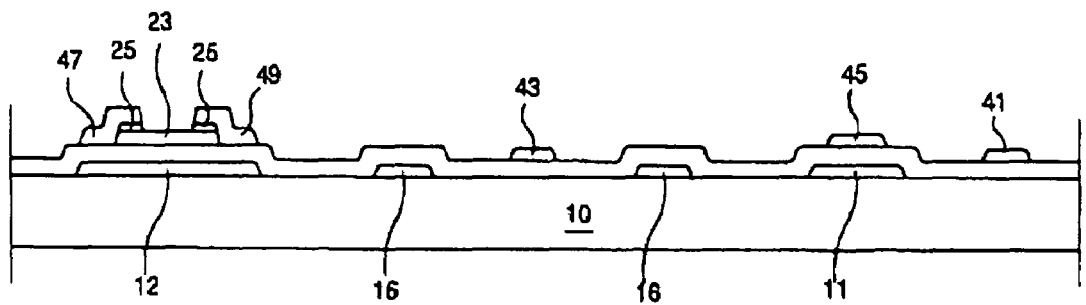
Figure 8D:
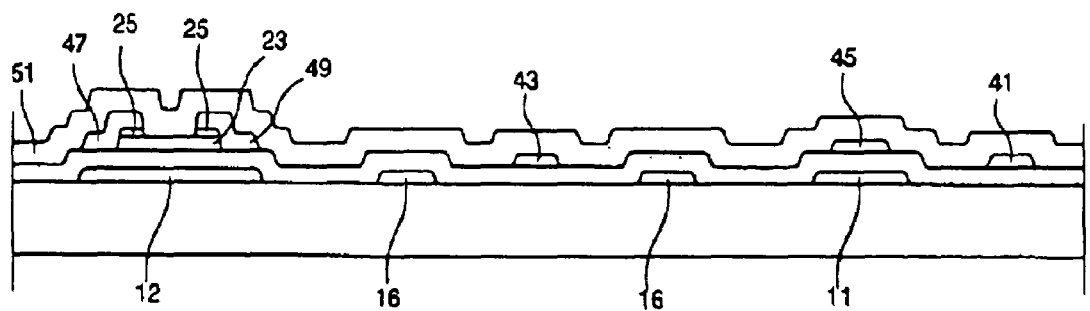
Figure 9A:
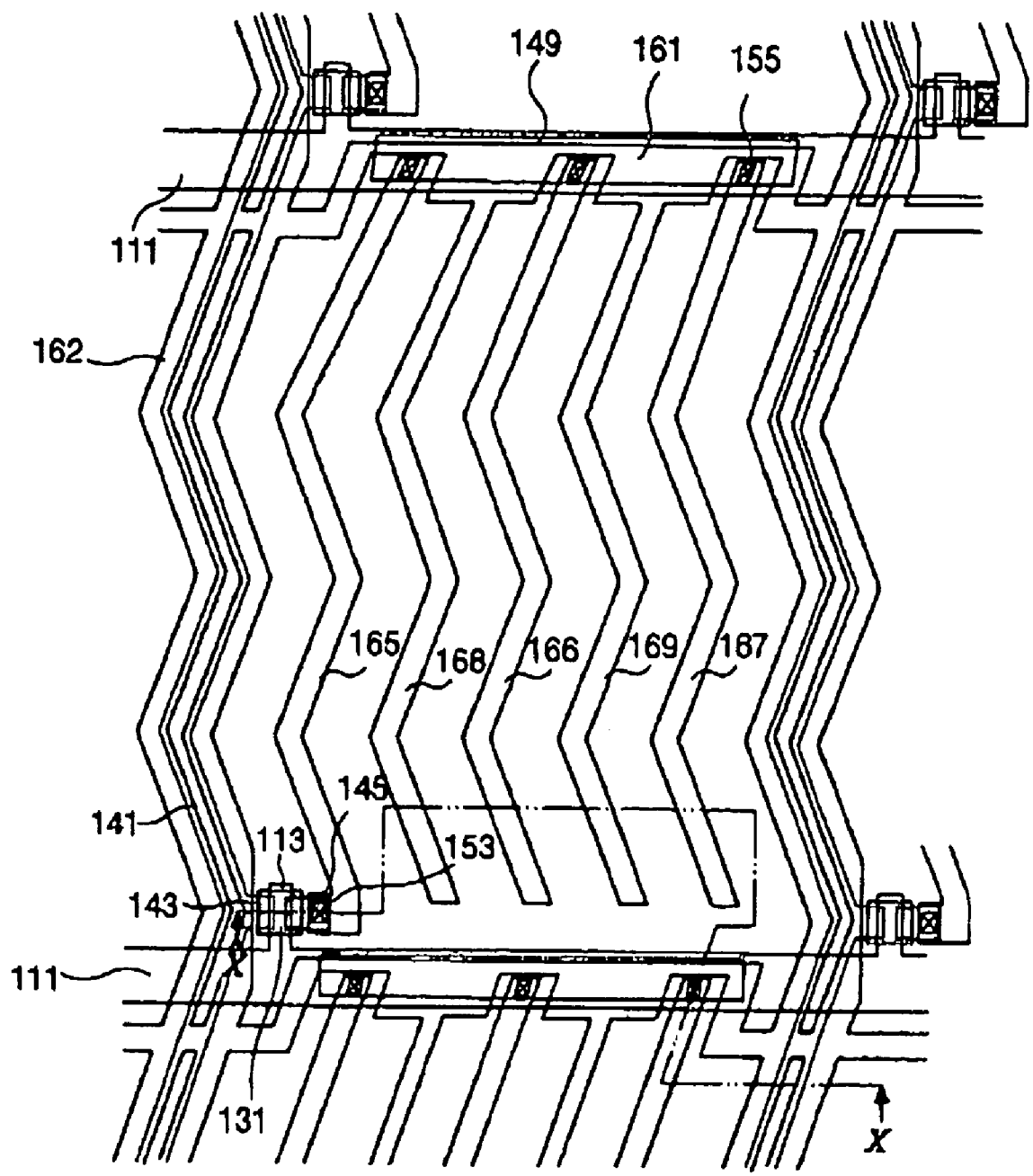
FIGS. 9A and 9B are schematic plan views of an array substrate of the IPS-LCD device according to the first and second embodiments of the present invention, respectively.
Figure 9B:
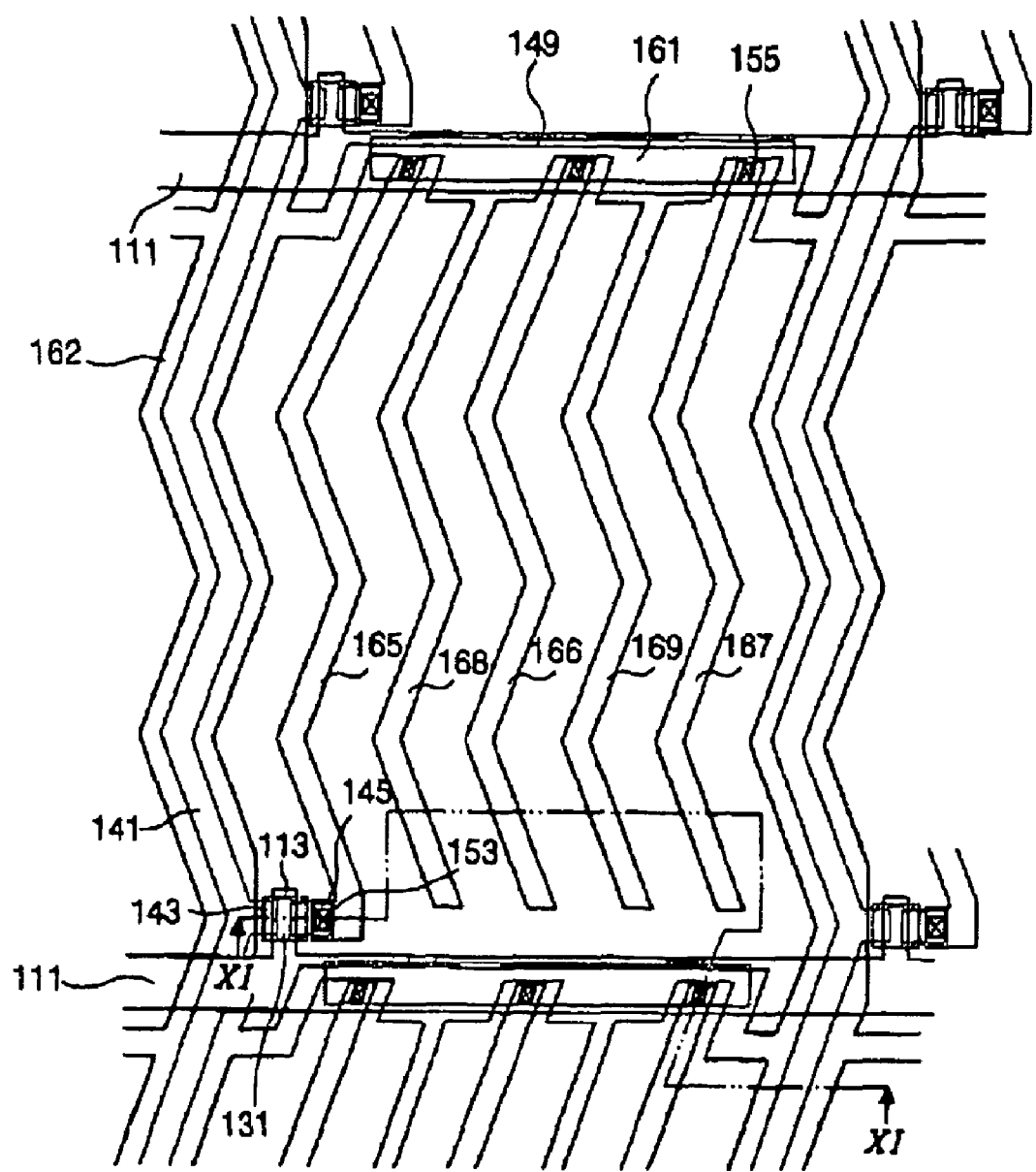

FIGS. 9A and 9B are schematic plan views of an array substrate of the IPS-LCD device according to a first embodiment and a second embodiment of the present invention, respectively.

As shown in FIG. 9A and FIG. 9B, a gate line 111 and gate electrode 113 are patterned on an insulating substrate (not shown). A gate insulator (not shown), for example, silicon nitride film (SiNx) or silicon oxide film (SiO$_2$), is formed thereon. An active layer 131 of amorphous silicon is patterned on the gate insulator of the gate electrode 113 and an ohmic contact layer of doped amorphous silicon is formed thereon. Then a data line 141, which defines a pixel region by crossing the gate line 111, and source and drain electrodes 143 and 145 are patterned thereon. The data line 141 has a substantially zigzag shape. The data line 141 and the source and drain electrodes 143 and 145 can be made of a metal. A passivation layer (not shown) is formed thereon and has a contact hole 153 exposing the drain electrode 145. Here, the passivation layer can be made of silicon nitride film (SiNx) or silicon oxide film (SiO$_2$) like the gate insulator, or organic material such as benzocyclobutene (BCB), acrylate or polyimide. First to third pixel electrodes 165, 166 and 167 having a substantially zigzag shape and first to third common electrodes 162, 168 and 169 having a substantially zigzag shape are patterned in the pixel region on the passivation layer. In the context of FIGS. 9A and 9B, the pixel electrodes 165, 166 and 167 and the common electrodes 162, 168 and 169 extend vertically and are spaced apart from each other horizontally. The pixel electrodes 165, 166 and 167 are alternated with the common electrodes 162, 168 and 169. The first common electrode 162 overlaps a portion of the data line 141 in FIG. 9A or covers the data line 141 in FIG. 9B, and extends to another first common electrode of a neighboring pixel. A metal pixel line 149 is connected to the pixel electrodes 165, 166 and 167 through the contact hole 155 and overlaps with the common line 161 to form a storage capacitor (storage electrode). The first pixel electrode 165 is connected to the drain electrode 145 through a contact hole 153. Here, the first to third common electrodes 162, 168 and 169 and the pixel electrodes 165, 166 and 167 are formed of transparent conductive material such as indium-tin-oxide (ITO) or indium-zinc-oxide (IZO), so that the aperture ratio can be improved.

FIGS. 10A to 10E are sequential cross-sectional views taken along a line "X—X" of FIG. 9A.

Figure 10A:
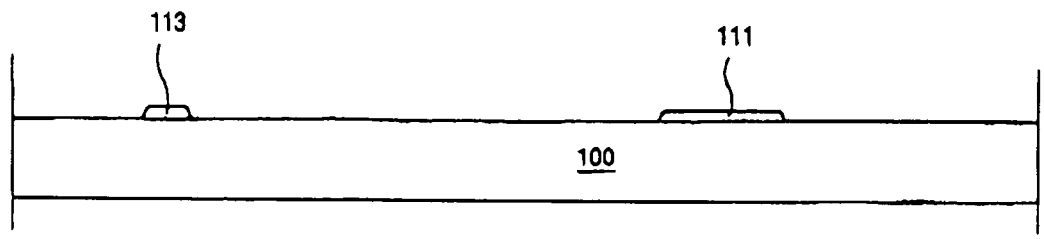
FIGS. 10A to 10E are sequential cross-sectional views taken along a line "X—X" of FIG. 9A.

As shown in FIG. 10A, a gate line 111 and a gate electrode 113 are patterned on a substrate 100 such as glass. As shown in the context of FIG. 9A, the gate line 111 extends horizontally.

Figure 10B:
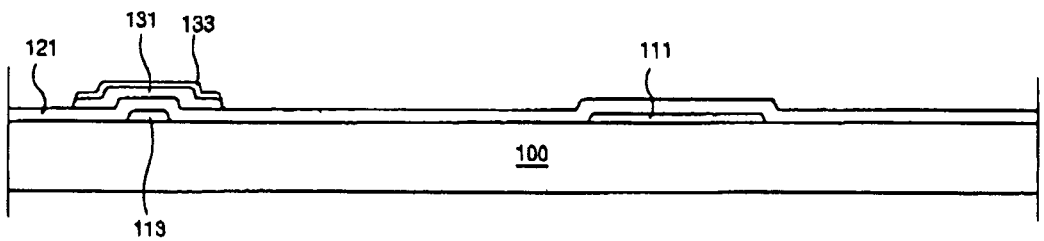

As shown in FIG. 10B, a gate insulator 121 is formed on the entire surface of the substrate 100, and then an active layer 131 of amorphous silicon or the like and an ohmic contact layer 133 of doped amorphous silicon, for example, are patterned. Here, the gate insulator 121 can be made of silicon nitride film (SiNx), silicon oxide film (SiO$_2$) or organic material such as BCB, acrylate, polyimide.

Figure 10C:
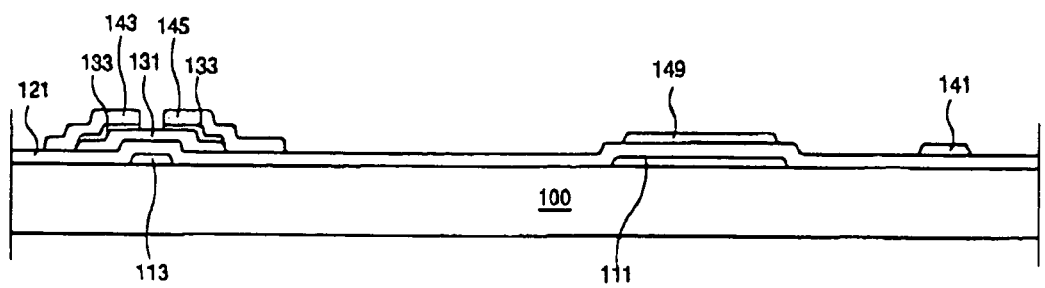

As shown in FIG. 10C, a data line 141, source and drain electrodes 143 and 145 and a metal pixel line 149 of conductive material, such as metal or transparent conductive material, are patterned. A pixel region is defined by the data line 141 crossing with the gate line 111. Source and drain electrodes 143 and 145 are adjacent to each other with the gate electrode 113 below them and below the space separating the source and drain electrodes 143 and 145. Here, the data line 141 has a substantially zigzag shape and the metal pixel line 149 operates as an upper electrode of a storage capacitor formed between the previous gate line 111 and the metal pixel line 149.

Figure 10D:
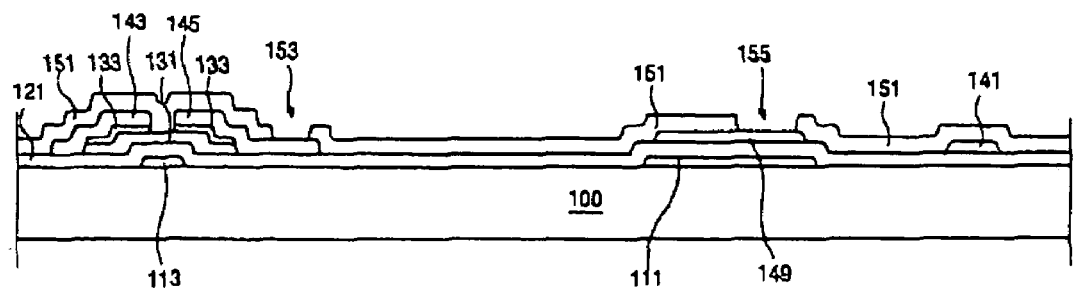

As shown in FIG. 10D, a passivation layer 151 of silicon nitride film (SiNx), silicon oxide film (SiO$_2$) or organic material such as BCB, acrylate, or polyimide is formed on the entire surface of the substrate. Then contact holes 153 and 155, which expose the drain electrode 145 and the metal pixel line 149, respectively, are patterned.

Figure 10E:
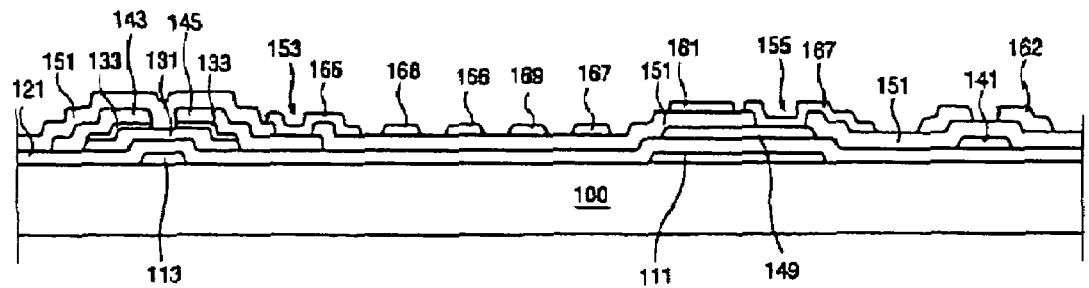

As shown in FIG. 10E, first to third pixel electrodes 165, 166 and 167 and first to third common electrodes 162, 168 and 169 of transparent conductive material such as ITO or IZO are patterned. The first common electrode 162 overlaps a portion of the data line 141. In the context of the FIGS. 9A and 10A–E, the first to third pixel electrodes 165, 166 and 167 and the first to third common electrodes 162, 168 and 169 having a substantially zigzag shape are vertically elongated and horizontally spaced apart from each other alternately. Even though the storage capacitor is mainly formed between the metal pixel line 149 and the previous gate line 111, it can be formed by another structure as understood by one of skill in the art.

Figure 11:
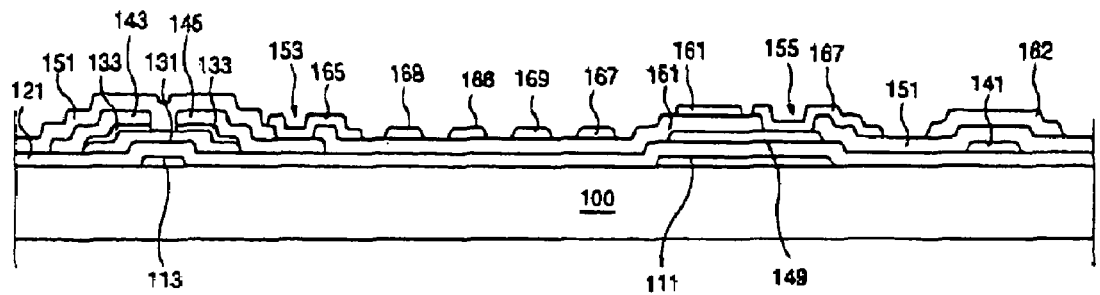
FIG. 11 is a schematic cross-sectional view taken along a line "XI—XI" of FIG. 9B.

FIG. 11 is a schematic cross-sectional view taken along a line "XI—XI" of FIG. 9B, in which the first common electrode 162 covers the data line 141.

Here, since the common electrode 162 overlaps or covers the data line 141, the space between the data line 141 and the end of the common electrode 162 is narrow and the aperture ratio can be improved. To make the most of these advantages, a black matrix of an upper substrate also should have a bent or substantially zigzag portion. However, since the black matrix made of resin cannot be formed with a bent portion because of the limits of the processing technology, the IPS-LCD device of FIGS. 9A and 9B uses a metallic black matrix with a high driving voltage.

To improve this problem, other embodiments are suggested.

Figure 12A:
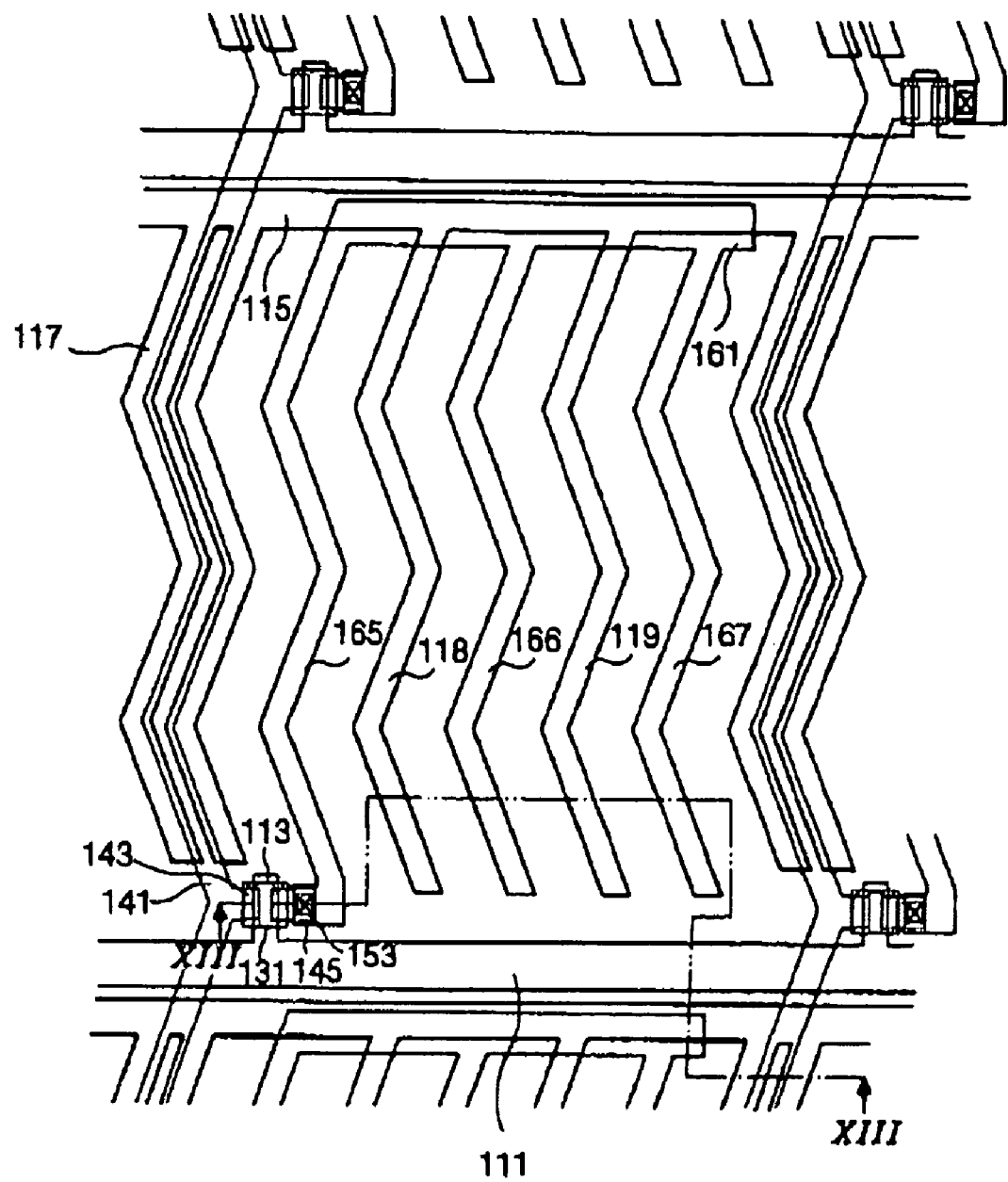
FIGS. 12A and 12B are schematic plan views of an array substrate of the IPS-LCD according to the third and forth embodiments of the present invention, respectively.
Figure 12B:
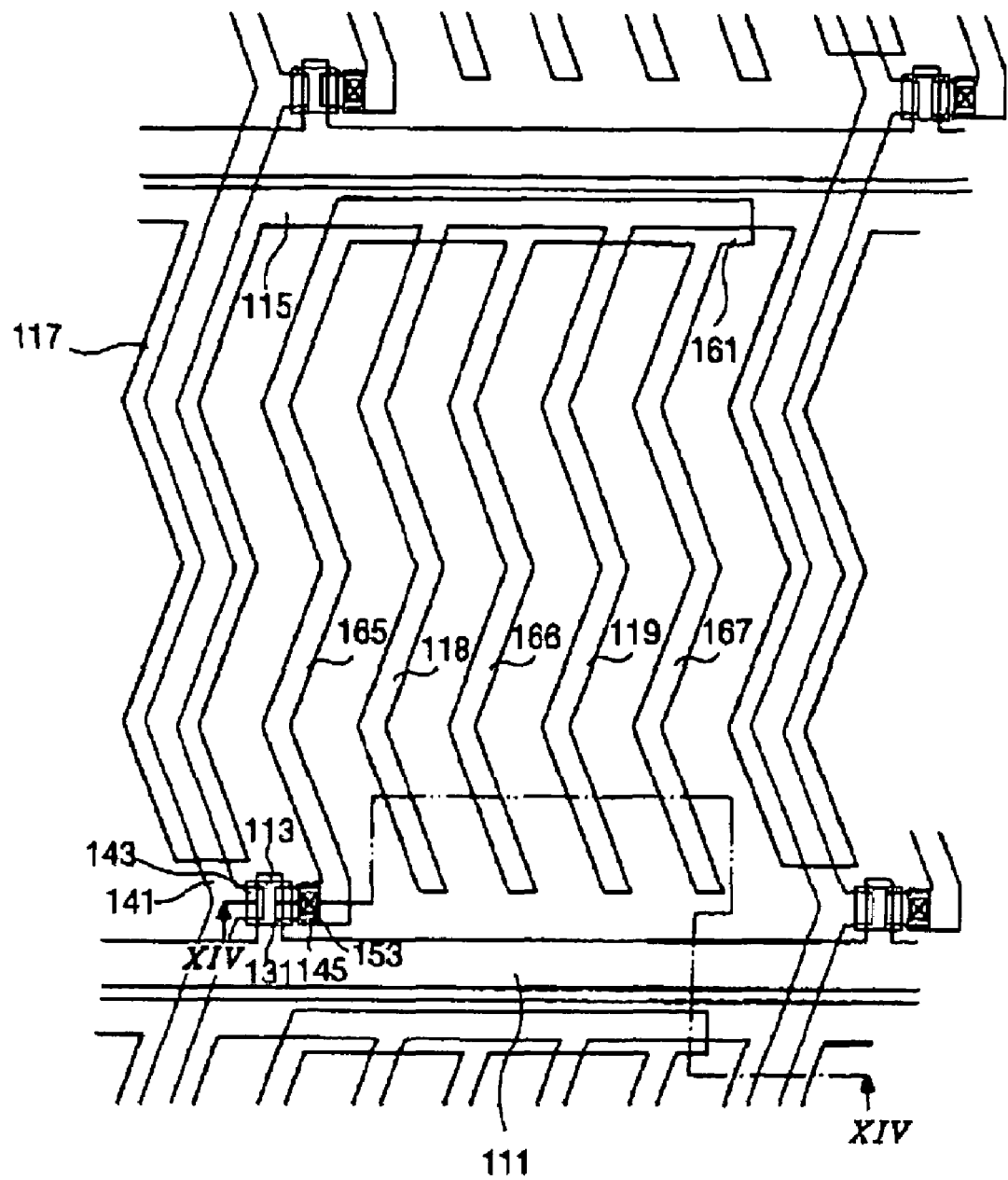

FIGS. 12A and 12B are schematic plan views of an array substrate of the IPS-LCD device according to a third embodiment and a fourth embodiment of the present invention, respectively.

As shown, a gate line 111 and gate electrode 113 are patterned on an insulating substrate (not shown). A common line 115 in substantially the same direction as the gate line 111 is patterned between a respective gate line 111 and first to third common electrodes 117, 118 and 119. The first to third common electrodes have a substantially zigzag shape and extend from the common line 115 roughly perpendicular to the gate line 111. A gate insulator, for example, silicon nitride film (SiNx) or silicon oxide film ($SiO_2$), is formed thereon. An active layer 131 of amorphous silicon is patterned on the gate insulator of the gate electrode 113 and an ohmic contact layer of doped amorphous silicon is formed thereon. Then a data line 141, which defines a pixel region by crossing the gate line 111, and source and drain electrodes 143 and 145 are patterned thereon. Here, the data line 141 has a substantially zigzag shape and overlaps the first common electrode 117 in FIG. 12A or covers the first common electrode 117 in FIG. 12B. The data line 141 and the source and drain electrodes 143 and 145 can be made of a metal. A passivation layer (not shown) is formed thereon and has a contact hole 153 exposing the drain electrode 145. Here, the passivation layer can be made of silicon nitride film (SiNx) or silicon oxide film ($SiO_2$) like the gate insulator, or organic material such as BCB, acrylate, or polyimide. First to third pixel electrodes 165, 166 and 167 having a substantially zigzag shape are patterned in the pixel region on the passivation layer. In the context of FIGS. 12A and 12B, the first to third pixel electrodes 165, 166 and 167 and the first to third common electrodes 117, 118 and 119 extend roughly vertically and are spaced apart horizontally. A pixel line 161 is connected to the pixel electrodes 165, 166 and 167 and overlaps with the common line 115 to form a storage capacitor. The first pixel electrode 165 is connected to the drain electrode 145 through a contact hole 153. Here, the common and pixel electrodes 117, 118, 119, 165, 166 and 167 and the data line 141 can be patterned to have at least one bent portion.

FIGS. 13A to 13E and FIG. 14 are sequential cross-sectional views taken along a line "XIII—XIII" of FIG. 12A showing the fabrication process of the IPS-LCD of the third and fourth embodiments.

Figure 13A:
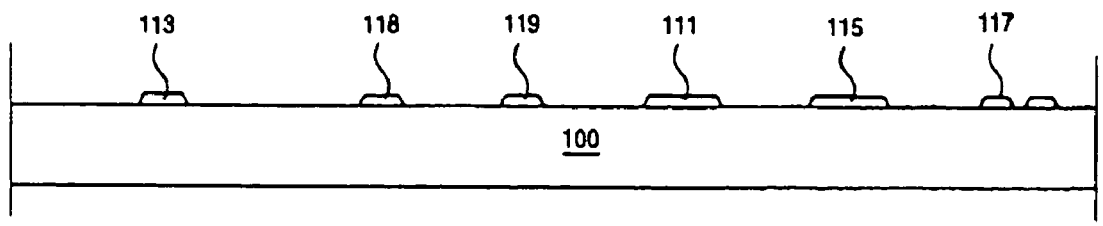
FIGS. 13A to 13E are sequential cross-sectional views taken along a line "XIII—XIII" of FIG. 12A.

As shown in FIG. 13A, a gate line 111, a gate electrode 113, a common line 115 and first to third common electrodes 117, 118 and 119 are patterned on a substrate 100 such as glass. The first common electrode 117 has two branches. In the context of FIGS. 12A and 12B, the gate line 111 and the common line 115 extend horizontally. In the context of FIGS. 12A and 12B the common electrodes 117, 118 and 119 having a substantially zigzag extend vertically and are connected to the common line 115. In this embodiment, even though the number of common electrodes is three for simplicity of description, the number can be changed depending on the distance between the common electrodes or the slant angle of the common electrodes. The gate line 111, the common line 115 and the common electrodes 117, 118 and 119 can be made of non-transparent material such as metal, for example, chromium (Cr), aluminum (Al), aluminum alloy, molybdenum (Mo), tantalum (Ta), tungsten (W), antimony (Sb), an alloy or a double layer thereof.

Figure 13B:
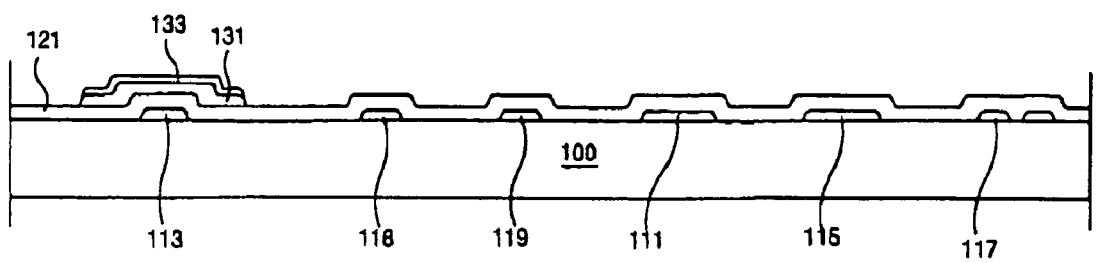

As shown in FIG. 13B, a gate insulator 121 is formed on the entire surface of the substrate 100 and then an active layer 131 of amorphous silicon and an ohmic contact layer 133 of doped amorphous silicon are patterned. Here, the gate insulator 121 can be made of silicon nitride film (SiNx), silicon oxide film ($SiO_2$) or organic material such as BCB, acrylate, or polyimide.

Figure 13C:
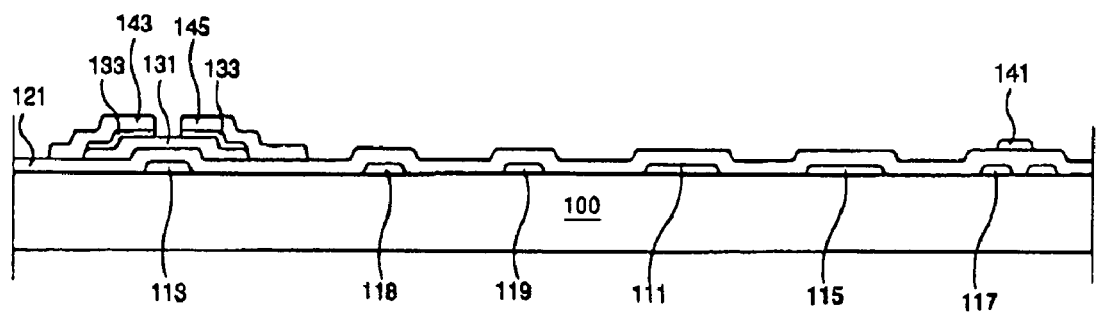

As shown in FIG. 13C, a data line 141, source and drain electrodes 143 and 145 of conductive material such as metal are patterned. A pixel region is defined by the data line 141 crossing with the gate line 111. Source and drain electrodes 143 and 145 are adjacent to each other and separated by a space, with the gate electrode 113 below the source and drain electrodes 143 and 145 and the space. Here, the data line 141 has a substantially zigzag shape and overlaps with the first common electrode 117.

Figure 13D:
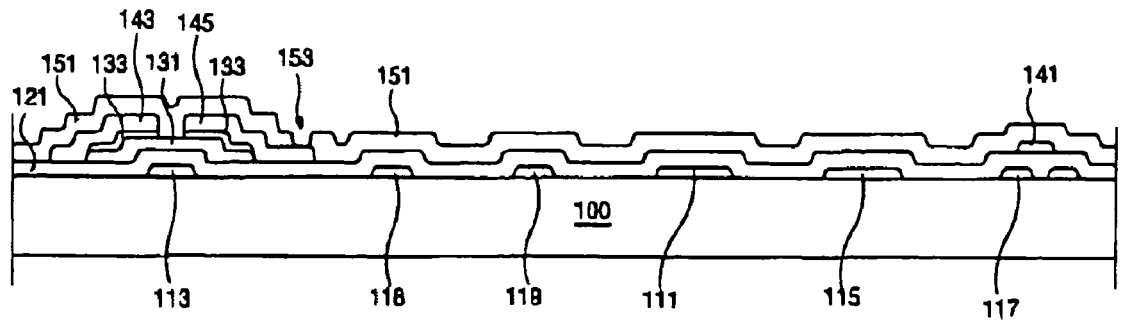

As shown in FIG. 13D, a passivation layer 151 of silicon nitride film (SiNx), silicon oxide film ($SiO_2$) or organic material such as BCB, acrylate, or polyimide is formed on the entire surface of the substrate and then a contact hole 153 exposing the drain electrode 145 is patterned.

Figure 13E:
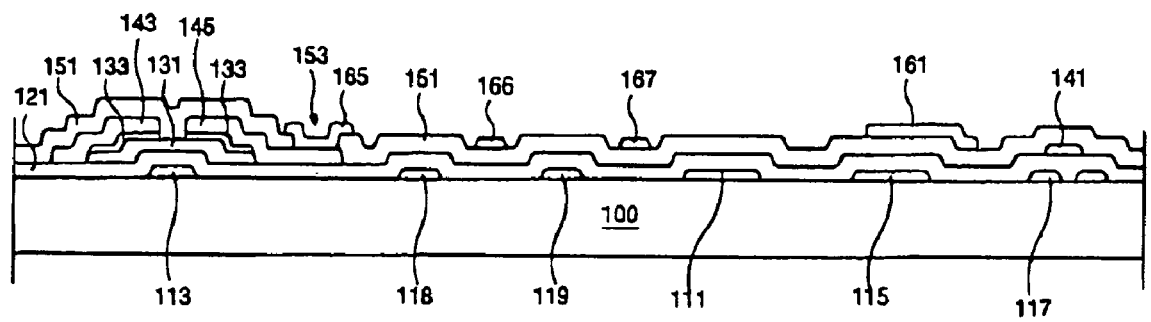

As shown in FIG. 13E, first to third pixel electrodes 165, 166 and 167 and a pixel line 161 of transparent conductive material such as indium-tin-oxide (ITO) or indium-zinc-oxide (IZO) are patterned. In the context of FIGS. 12A and 12B, the first to third pixel electrodes 165, 166 and 167 having a substantially zigzag shape extend vertically and are spaced apart from the corresponding common electrodes 117, 118 and 119 horizontally. The pixel line 161 and pixel electrodes 165, 166 and 167 can be made of non-transparent conductive material.

In the array substrate of the IPS-LCD device according to the third embodiment of the present invention, since the data line 141 overlaps the first common electrode 117 and the data line 141 and the first common electrode 117 operate as a black matrix, the black matrix of the upper substrate can have only the row line. Therefore, the black matrix of the upper substrate can be made of resin and the aperture ratio can be improved by using the area near the data line 141 as a pixel region. Moreover, in other embodiments, the common electrodes 117, 118 and 119 can be patterned on the gate insulator 121.

Figure 14:
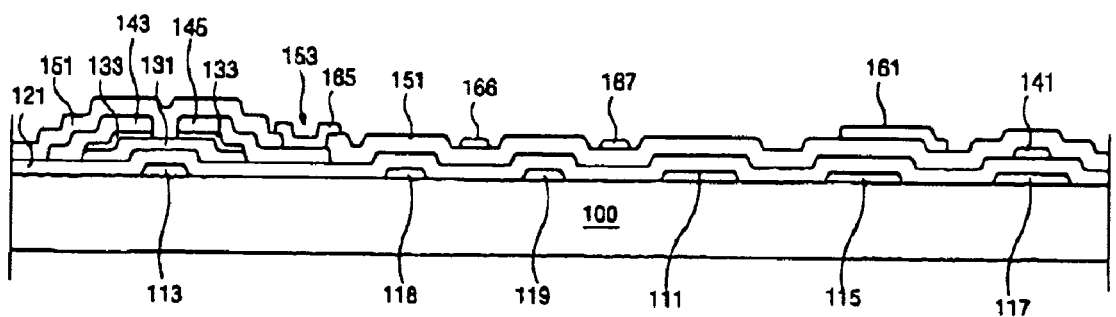
FIG. 14 is a schematic cross-sectional view taken along a line "XIV—XIV" of FIG. 12B.

FIG. 14 is a schematic cross-sectional view of an array substrate of the IPS-LCD device taken along a line "XIV—XIV" of FIG. 12B, in which the data line 141 covers the first common electrode 117.

Figure 15A:
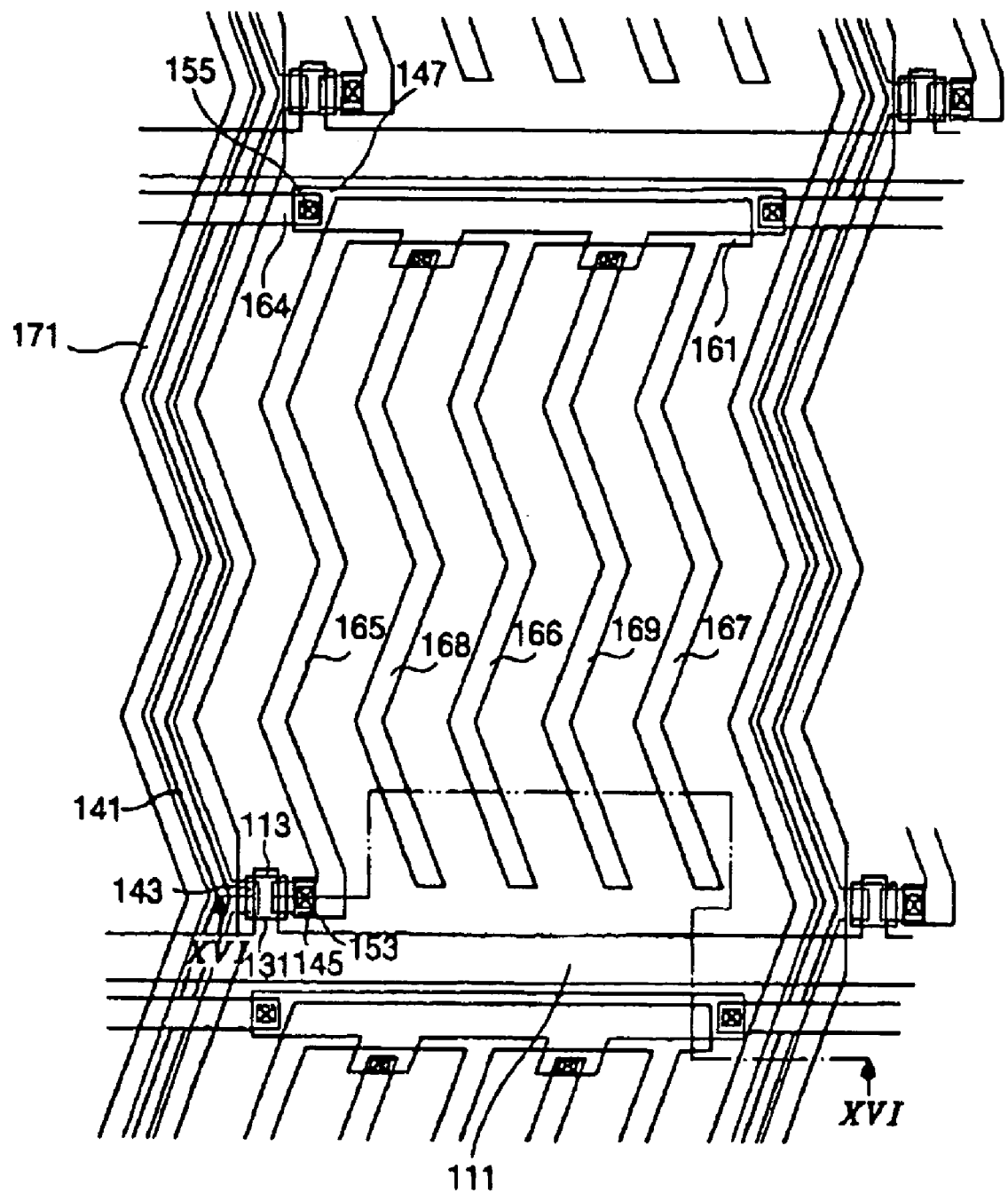
FIGS. 15A and 15B are schematic plan views of an array substrate of the IPS-LCD device according to the fifth and sixth embodiments of the present invention, respectively.

FIGS. 15A and 151B are schematic plan views of an array substrate of the IPS-LCD device according to a fifth embodiment and a sixth embodiment of the present invention with the more improved aperture ratio.

Figure 15B:
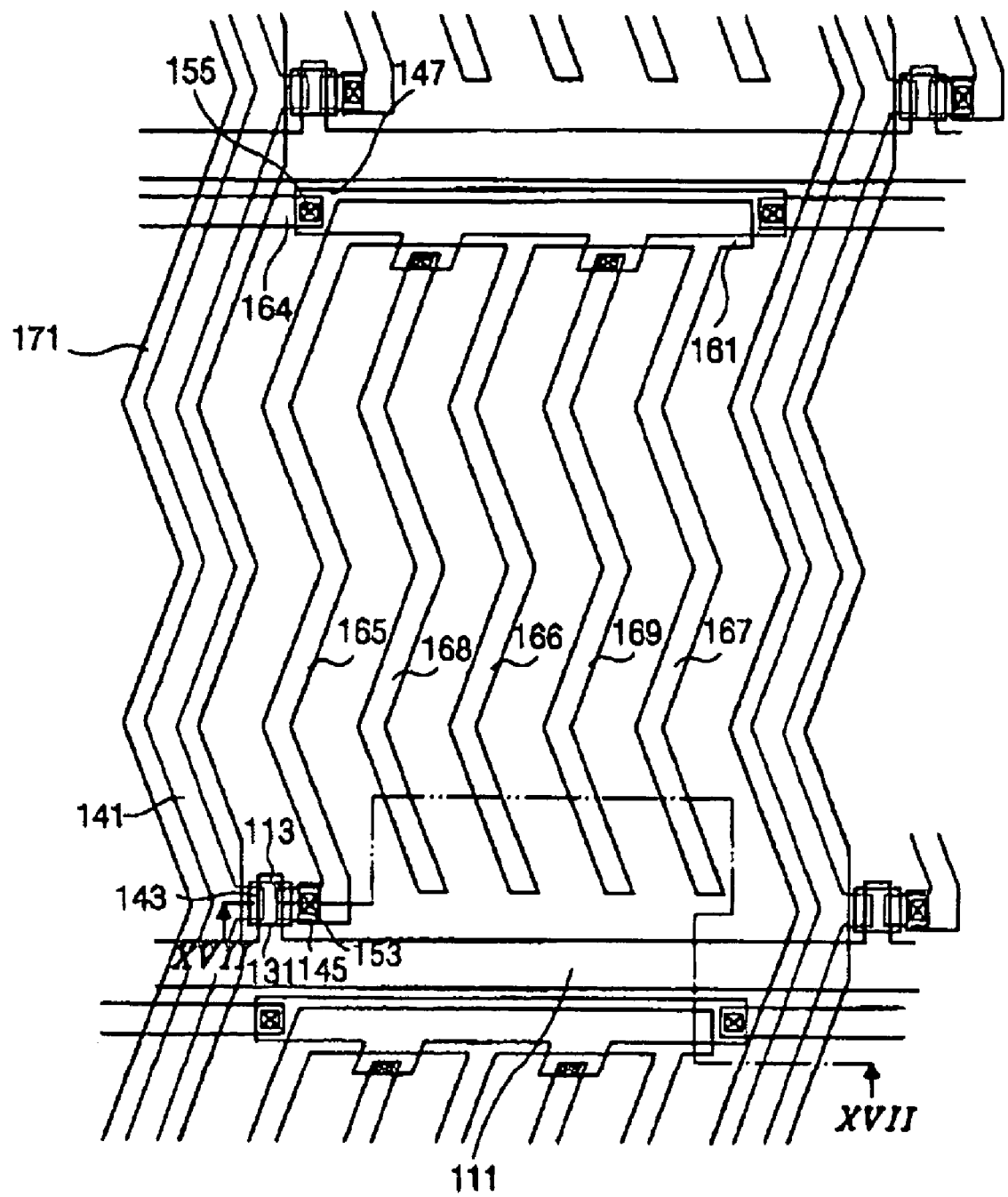

As shown, a gate line 111 and gate electrode 113 are patterned on an insulating substrate (not shown). A gate insulator (not shown), for example, silicon nitride film (SiNx) or silicon oxide film ($SiO_2$), is formed thereon. An active layer 131 of amorphous silicon is patterned on the gate insulator of the gate electrode 113 and an ohmic contact layer of doped amorphous silicon is formed thereon. Then a data line 141, which defines a pixel region by crossing the gate line 111, and source and drain electrodes 143 and 145 are patterned thereon. The data line 141 has a substantially zigzag shape. The data line 141 and the source and drain electrodes 143 and 145 can be made of a metal. A passivation layer is formed thereon and has a contact hole 153 exposing the drain electrode 145. Here, the passivation layer can be made of silicon nitride film (SiNx) or silicon oxide film ($SiO_2$) like the gate insulator, or organic material such as BCB, acrylate, or polyimide. First to third pixel electrodes 165, 166 and 167 and first to third common electrodes 171, 168 and 169 having a substantially zigzag shape are patterned in the pixel region on the passivation layer. In the context of FIGS. 15A and 15B, the pixel electrodes 165, 166 and 167 and the common electrodes 171, 168 and 169 extend roughly vertically and are spaced apart from each other horizontally. The pixel electrodes 165, 166 and 167 are alternated with the common electrodes 171, 168 and 169. The first common electrode 171 overlaps the data line 141 in FIG. 15A or covers the data line 141 in FIG. 15B and extends to another common electrode of a neighboring pixel. A pixel line 161 is connected to the pixel electrodes 165, 166 and 167 and overlaps with the metal common line 147, which is connected to the common line 164 through the contact hole 155, to form a storage capacitor. The storage capacitor can be made between the pixel line 161 and the previous or adjacent gate line. The first pixel electrode 165 is connected to the drain electrode 145 through a contact hole 153. Here, the first common electrode 171 is formed of non-transparent material such as metal and the other common electrodes 168 and 169, and the pixel electrodes 165, 166 and 167 and the pixel line 161 are formed of transparent conductive material such as ITO or IZO.

FIGS. 16A to 16F are sequential cross-sectional views taken along a line "XVI—XVI" of FIG. 15A showing the fabrication process.

Figure 16A:
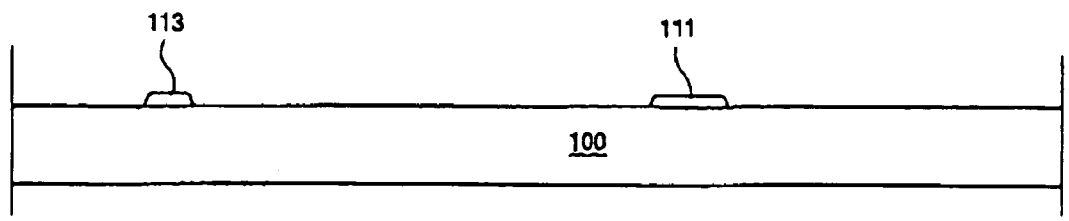
FIGS. 16A to 16F are sequential cross-sectional views taken along a line "XVI—XVI" of FIG. 15A.

As shown in FIG. 16A, a gate line 111 and a gate electrode 113 are patterned on a substrate 100 such as glass. The gate line 111 is horizontally elongated.

Figure 16B:
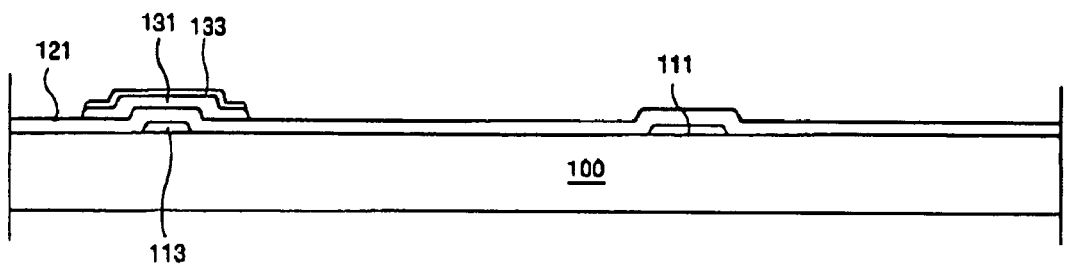

As shown in FIG. 16B, a gate insulator 121 is formed on the entire surface of the substrate 100 and then an active layer 131, of amorphous silicon and an ohmic contact layer 133 of doped amorphous silicon are patterned. Here, the gate insulator 121 can be made of silicon nitride film (SiNx), silicon oxide film (SiO$_2$) or organic material such as BCB, acrylate, or polyimide.

Figure 16C:
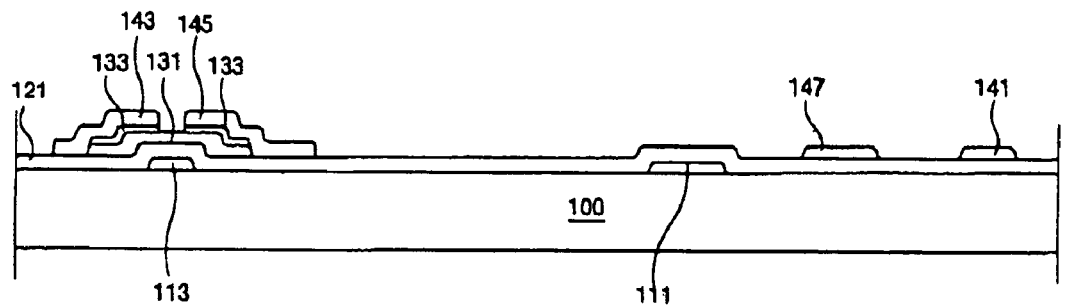

As shown in FIG. 16C, a data line 141, source and drain electrodes 143 and 145 and a metal common line 147 of conductive material such as metal are patterned. The data line 141 defines a pixel region by crossing with the gate line 111 and source and drain electrodes 143 and 145 are adjacent to each other with the gate electrode 113 below the source and drain electrodes 143 and 145 and below a space separating the source and drain electrodes 143 and 145. Here, the data line 141 has a substantially zigzag shape and the metal common line 147 operates as a lower electrode of a storage capacitor.

Figure 16D:
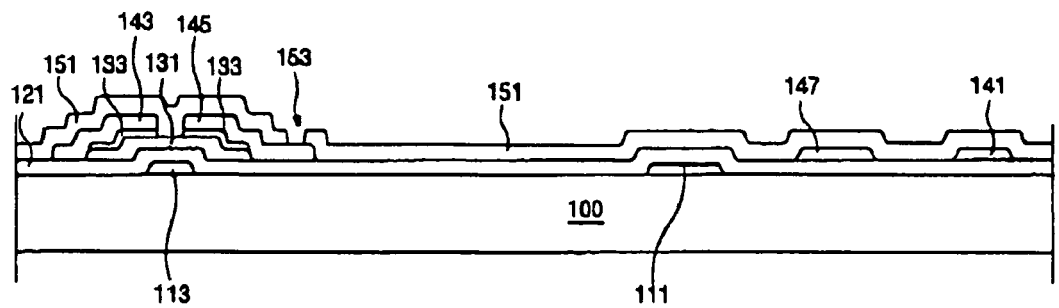

As shown in FIG. 16D, a passivation layer 151 of silicon nitride film (SiNx), silicon oxide film (SiO$_2$) or organic material such as BCB, acrylate, or polyimide is formed on the entire surface of the substrate, and then a contact hole 153 exposing the drain electrode 145 is patterned. In the case of using organic material of low dielectric constant such as BCB, acrylate or polyimide for the passivation layer, the interference of the first common electrode 171 voltage, which results from the overlap of the data line 141 and the first common electrode 171, can be minimized.

Figure 16E:
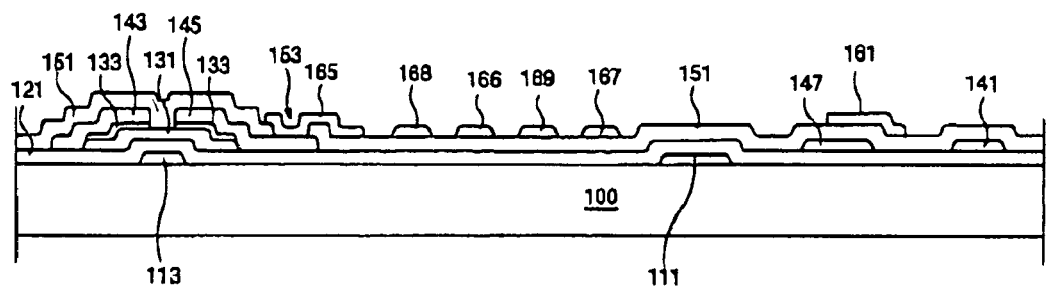

As shown in FIG. 16E, first to third pixel electrodes 165, 166 and 167, a pixel line 161 and second and third common electrodes 168 and 169 of transparent conductive material such as indium-tin-oxide (ITO) or indium-zinc-oxide (IZO) are patterned.

Figure 16F:
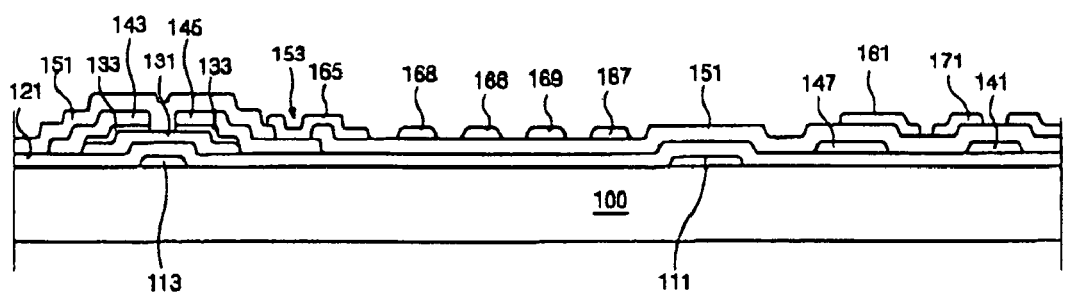

As shown in FIG. 16F, subsequently, the first common electrode 171 of conductive material such as metal is patterned, connected to the common line 164 as in FIGS. 15A and 15B and overlaps a portion of the data line 141. The first common electrode 171 can be made during the step of forming the gate electrode 113. The other common electrodes 168 and 169 and the pixel electrodes 165, 166 and 167 can be made of transparent conductive material such as ITO or IZO, so that the data line 141 also can be formed in the substantially zigzag shape regardless of the material of the black matrix formed on the upper substrate, and the transmittance and the aperture ratio can be improved. Here, in the context of FIGS. 15A and 15B, the first to third pixel electrodes 165, 166 and 167 and the first to third common electrodes 171, 168 and 169 having a substantially zigzag shape extend in roughly a vertical direction and are spaced apart horizontally from each other in an alternating pattern. Even though first to third pixel electrodes 165, 166 and 167, a pixel line 161 and second and third common electrodes 168 and 169 are patterned and then the first common electrode 171 is patterned, the first common electrode 171 can be patterned before the third pixel electrodes 165, 166 and 167, the pixel line 161 and the second and third common electrodes 168 and 169, which can be patterned later. Even though the storage capacitor is formed between the metal common line 147 and the pixel line 161, another structure of storage capacitor can be adopted as one of skill in the art would understand.

Figure 17:
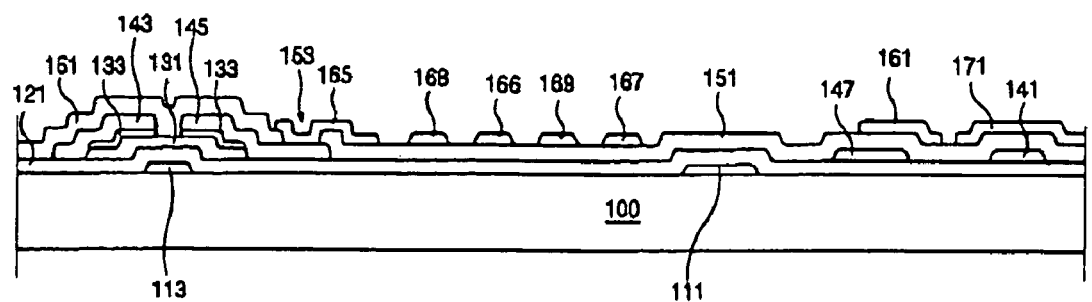
FIG. 17 is a schematic cross-sectional view taken along a line "XVII—XVII" of FIG. 15B.

FIG. 17 is a schematic cross-sectional view of an array substrate of the IPS-LCD device taken along a line "XVII—XVII" of FIG. 15B, in which the first common electrode 171 covers the data line 141.

In the array substrate of the IPS-LCD device according to the fifth and sixth embodiments of the present invention, even though the first common electrode 171 that overlaps or covers the data line 141 is made of opaque material such as Cr or Al, the second and third common electrodes 168 and 169 are made of transparent material such as ITO or IZO. Therefore, the aperture ratio can be improved by increase of transmittance. Moreover, since the common and pixel electrodes are formed on the same layer, the problem of residual images can be solved.

Consequently, in the IPS-LCD device for wide viewing angle, since the common electrodes are made of a transparent material such as ITO or IZO and at least one common electrode overlaps or covers the data line, the aperture ratio can be improved and the problems such as residual images or flicker can be solved with the metallic black matrix of the upper substrate. On the other hand, to decrease the power consumption, a black matrix of the upper substrate should be made of resin. In other embodiments, one of the common electrodes can be formed to overlap partially or to cover the data line and operate as the black matrix, so that the black matrix of the upper substrate can be made of resin, and the driving voltage and the power consumption can be reduced. Therefore, since the data line can be made in a substantially zigzag shape regardless of the material of the black matrix formed on the upper substrate, the multi-domain IPS-LCD device actually can be fabricated without increasing the driving voltage or decreasing aperture ratio.

It will be apparent to those skilled in the art that various modifications and variation can be made in the method of manufacturing a flat pane display device of the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching liquid crystal display device, comprising:
   a substrate;
   a gate line and a data line on the substrate, the data line having at least one bent portion;

a thin film transistor at a crossing portion of the gate and data lines;

a passivation layer on an entire surface of the substrate including the thin film transistor, wherein the passivation layer is formed of one of silicon nitride film ($SiN_x$), silicon oxide film ($SiO_2$) and benzocyclobutene (BCB);

a plurality of common electrodes on the passivation layer, the plurality of common electrodes having at least one bent portion, wherein at least one of the plurality of common electrodes overlaps at least a portion of the data line;

a common line connected to the common electrodes; and a plurality of pixel electrodes on the passivation layer, the plurality of pixel electrodes being alternated with the common electrodes, each pixel electrode having at least one bent portion.

2. The array substrate of claim 1, further comprising a pixel line extending along a direction of the gate line and connected to the plurality of pixel electrodes.

3. The array substrate according to claim 2, wherein the pixel line partially overlaps the common line.

4. The array substrate according to claim 2, further comprising a storage capacitor located between the common line and the pixel line.

5. The array substrate according to claim 1, wherein the at least one common electrode overlapping the data line is formed of a non-transparent material.

6. The array substrate according to claim 1, wherein the common line is located adjacent to the gate line.

7. The array substrate of claim 1, wherein the plurality of pixel electrodes and the common electrodes other than the at least one common electrode overlapping at least a portion of the data line are formed on a same layer.

8. A method of fabricating an array substrate, comprising:

forming a gate line, a gate electrode, and data line on a substrate, the data line having substantially zigzag shape;

forming a gate insulator on the gate line and gate electrode;

forming a thin film transistor at a crossing of the gate and data lines;

forming a passivation layer on an entire surface of the substrate including the thin film transistor, wherein the passivation layer is formed of one of silicon nitride film ($SiN_x$), silicon oxide film ($SiO_2$) and benzocyclobutene (BCB);

forming a plurality of common electrodes on the passivation layer, the plurality of common electrodes having a substantially zigzag shape, wherein at least one of the plurality of common electrodes overlaps at least a portion of the data line;

forming a common line connected to the plurality of common electrodes; and forming a plurality of pixel electrodes and a pixel line on the passivation layer, the plurality of pixel electrodes having a substantially zigzag shape.

9. The method of claim 8, wherein the pixel line partially overlaps the common line.

10. The method of claim 8, wherein the at least one common electrode overlapping the data line is formed of a non-transparent material.

11. The method of claim 8, further comprising forming a storage capacitor between the common line and the pixel line.

12. The method of claim 8, wherein the common line is formed adjacent the gate line.

13. The method of claim 8, wherein the plurality of pixel electrodes and the common electrodes other than the at least one common electrode overlapping at least a portion of the data line are formed on a same layer.

14. A method of fabricating an array substrate, comprising:

forming a gate line and gate electrode on a substrate;

forming a gate insulator on the gate line and gate electrode;

forming a data line, wherein the data line has a substantially zigzag shape;

forming a thin film transistor at a crossing portion of the gate line and data line;

forming a passivation layer on an entire surface of the substrate including the thin film transistor, wherein the passivation layer is formed of one of silicon nitride film ($SiN_x$), silicon oxide film ($SiO_2$) and benzocyclobutene (BCB);

forming a plurality of common electrodes and a plurality of pixel electrodes on the passivation layer, the common and pixel electrodes having a substantially zigzag shape and being alternated with each other, wherein at least one of the common electrodes overlaps a portion of the data line; and forming a common line connected to the plurality of common electrodes.

15. The method of claim 14, further comprising forming a pixel line extending along a direction of the gate line and connected to the plurality of pixel electrodes.

16. The method of claim 15, wherein the pixel line partially overlaps the common line.

17. The method of claim 15, further comprising forming a storage capacitor between the common line and the data line.

18. The method of claim 14, wherein the at least one common electrode overlapping the data line is formed of a non-transparent material.

19. The method of claim 14, wherein the plurality of pixel electrodes and the common electrodes other than the at least one common electrode overlapping at least a portion of the data line are formed on a same layer.

* * * * *